United States Patent [19]
Okada

[11] Patent Number: 5,883,504
[45] Date of Patent: Mar. 16, 1999

[54] POWER SUPPLY UNIT

[75] Inventor: Hiroyuki Okada, Kyoto, Japan

[73] Assignee: ROHM Co., Ltd., Kyoto, Japan

[21] Appl. No.: 47,345

[22] Filed: Mar. 25, 1998

[30] Foreign Application Priority Data

Mar. 26, 1997 [JP] Japan .................................. 9-073846

[51] Int. Cl.$^6$ .............................. G05F 1/569; H02H 7/00
[52] U.S. Cl. .............................................. 323/276; 361/18
[58] Field of Search .................................. 323/266, 268,
323/270, 271, 273, 275, 276; 361/18, 79,
86, 87, 89, 94

[56] References Cited

U.S. PATENT DOCUMENTS

| | | | |
|---|---|---|---|
| 4,019,096 | 4/1977 | Bullinga | 361/86 |
| 4,891,728 | 1/1990 | Preis et al. | 323/276 |
| 4,937,697 | 6/1990 | Edwards et al. | 361/18 |
| 5,214,359 | 5/1993 | Herndon et al. | 318/434 |
| 5,619,127 | 4/1997 | Warizaya | 323/275 |

*Primary Examiner*—Matthew Nguyen
*Attorney, Agent, or Firm*—Nikaido, Marmelstein, Murray & Oram LLP

[57] ABSTRACT

A power supply unit has a transistor and a resistor circuit connected in series between a power source line and a reference potential point. The node between the transistor and the resistor circuit is connected to an output terminal. A capacitor is connected between the output terminal and the reference potential point. In response to the activation of a starting switch, the transistor is turned on. The power supply unit further has a delay circuit for delaying a rise in the voltage at a predetermined point in the resistor circuit, a current limiting circuit for limiting the current flowing through the transistor, and a current limiting level control circuit for controlling, in accordance with the output of the delay circuit, the level to which the current limiting circuit limits the current. Thus, output of an unduly large current is suppressed when the power supply unit is started up in response to the activation of the starting switch.

6 Claims, 7 Drawing Sheets

POWER SUPPLY UNIT

BACKGROUND OF THE INVENTION

1. Field of the Invention

The present invention relates to a power supply unit for supplying electric power to a load circuit.

2. Description of the Prior Art

Figure 6:
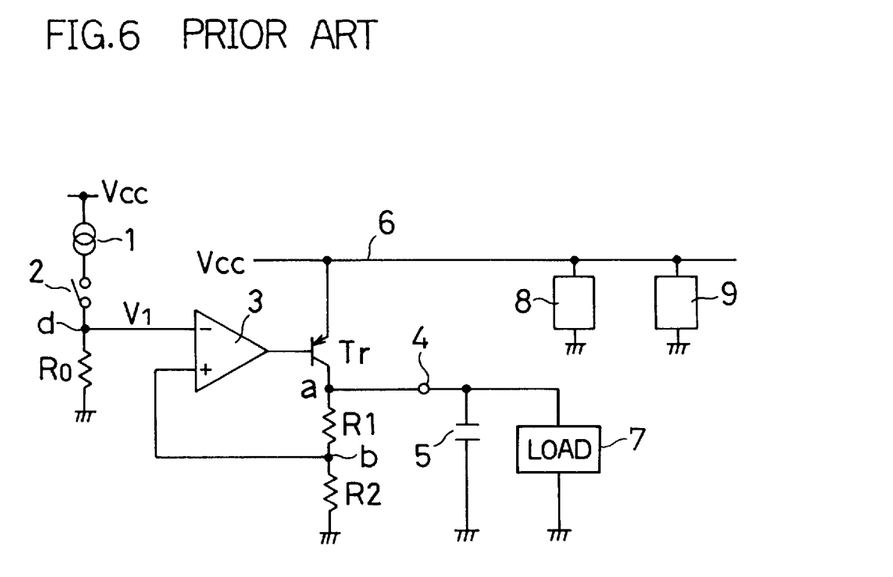
FIG. 6 is a circuit diagram of a conventional power supply unit.

FIG. 6 shows a conventional constant-voltage power supply unit. As shown in FIG. 6, this power supply unit has a pnp-type output transistor Tr, a first resistor R1, and a second resistor R2 connected in this order between the power source line 6 supplying a voltage Vcc and ground (reference potential point), with the node a between the collector of the output transistor Tr and the first resistor R1 connected to an output terminal 4.

The node b between the first and second resistors R1 and R2 is connected to the non-inverting input terminal (+) of a comparator 3. The inverting input terminal (−) of the comparator 3 is connected to the node d between one end of a resistor $R_0$ and a starting switch 2. The other end of the resistor $R_0$ is connected to ground, and the other end of the switch 2 is connected by way of a constant current source 1 to the power source line 6 supplying the voltage Vcc. It is assumed that the voltage at the node d is V1 when the starting switch 2 is turned on. To the output terminal 4, a capacitor 5 is connected to prevent oscillation of the power supply unit.

In reality, the capacitance of the load 7 that is connected to the output terminal 4 is additionally connected in parallel with the capacitor 5. However, for simplicity's sake, it is assumed here that the capacitor 5 includes the capacitance of the load 7. The power supply unit having the above-described construction starts operating when the switch 2 is turned on.

As soon as the switch 2 is turned on, the voltage V1 at the node d is applied to the inverting input terminal (−) of the comparator 3. As a result, the comparator 3 outputs a low level and thereby turns on the transistor Tr, allowing the capacitor 5 to be charged quickly. When the voltage at the node b exceeds the voltage V1, the comparator 3 outputs a high level and thereby turns off the transistor Tr. However, as an electric current is kept supplied to the load 7, the voltage at the node b drops, until eventually the transistor Tr is turned on again. Thus, the output transistor Tr operates in such a way that the voltage at the node b (thus the voltage at the output terminal 4) is kept constant.

Figure 7:
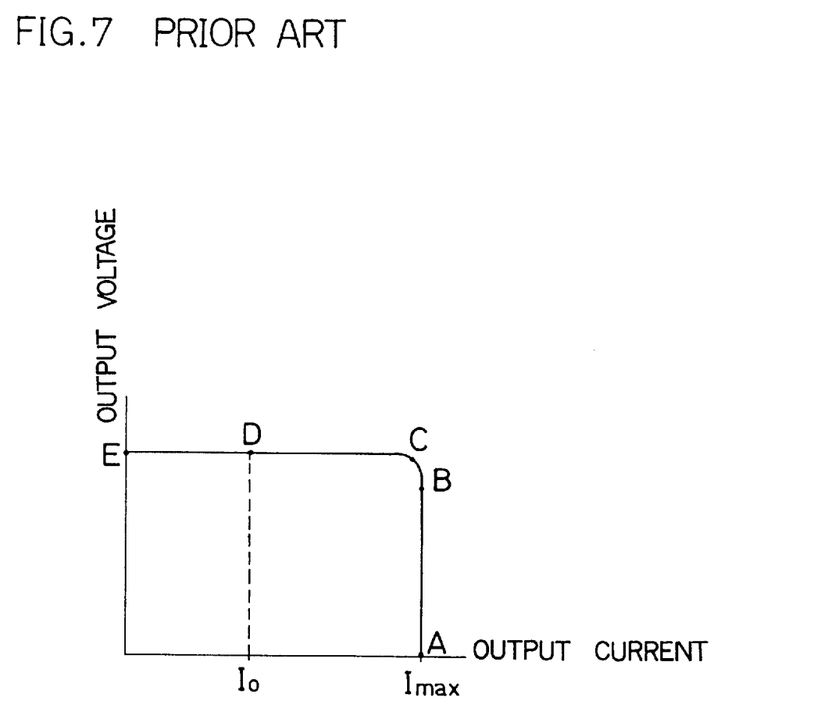
FIG. 7 is a diagram showing the characteristic curve of the output current at the start-up of the conventional power supply unit.

In this conventional power supply unit, just when it is started up by turning on the switch 2, a predetermined maximal current flows through the capacitor 5. As the characteristic curve shown in FIG. 7 indicates, the current Imax that flows at the start-up is larger than the current Io that is ordinarily supplied to the load, and thus the output current varies through points A, B, C, and D on the curve in this order before it settles down to point D.

Inconveniently, this causes the source of the output current, i.e. the power source line 6, to become unstable. As a result, other circuits 8 and 9 that are also connected to the same power source line 6 may malfunction. For example, if the circuits 8 and 9 include a microcomputer, there is a possibility that the microcomputer is reset unexpectedly.

SUMMARY OF THE INVENTION

An object of the present invention is to provide a power supply unit that does not output an unduly large current when it is started up by means of a starting switch.

To achieve the above object, according to one aspect of the present invention, a power supply unit having an output terminal connected to a node between a transistor and a resistor that are connected in series between a power source line and a reference potential point and having a capacitor connected between the output terminal and the reference potential point, wherein the transistor is turned on in response to activation of a starting switch, is provided with a delay circuit for delaying variations in an output voltage appearing at the output terminal; a current limiting circuit for limiting a current flowing through the transistor; and a current limiting level control circuit for controlling, in accordance with an output of the delay circuit, a level to which the current limiting circuit limits the current. In addition, in this power supply unit, output of an unduly large current is suppressed when the power supply unit is started up in response to the activation of the starting switch.

According to another aspect of the present invention, a power supply unit is provided with a pnp-type output transistor and a resistor circuit connected in series between a power source line and ground; an output terminal connected to a node between the output transistor and the resistor circuit; a capacitor connected between the output terminal and ground; a first transistor of a pnp type whose emitter and base are connected respectively to an emitter and a base of the output transistor; a first resistor connected between a collector of the first transistor and ground; a starting switch for starting the power supply unit; base current supplying means for starting supply of base currents to the output transistor and to the first transistor in response to operation of the starting switch; means for controlling the base current supplying means in such a way that the base currents are reduced in accordance with a voltage appearing across the first resistor; a plurality of pairs of a resistor and a switching device, each pair being connected in parallel with the first resistor; delay means for delaying a rise in a voltage at a predetermined point in the resistor circuit; means for producing an output signal stepwise in accordance with a rise in an output of the delay means; and means for directing the output signal to the switching devices in such a way that the switching devices are turned on and off in accordance with the output signal that is produced stepwise.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
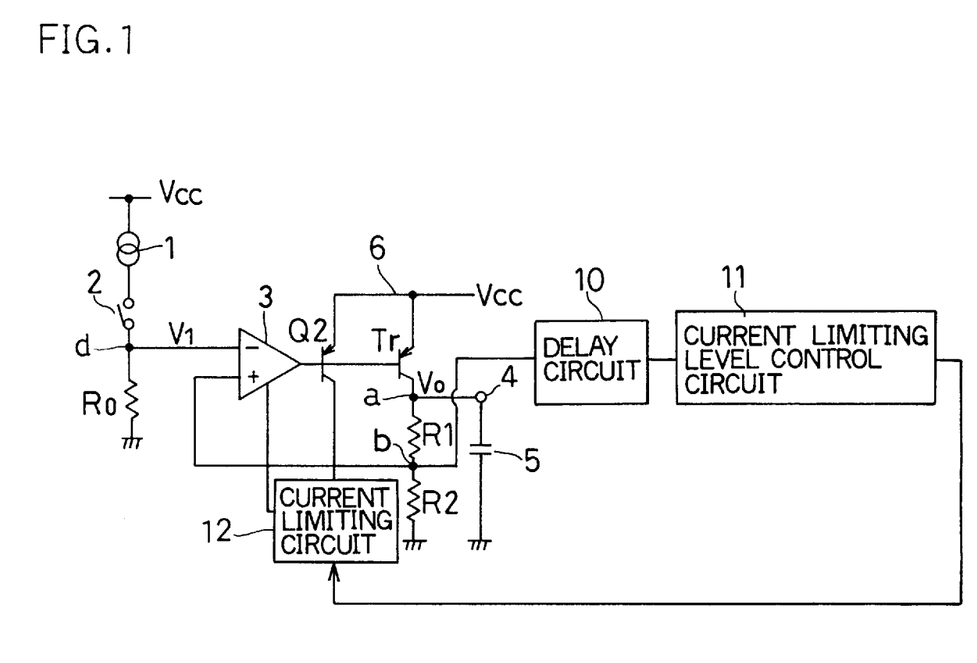
FIG. 1 is a circuit diagram showing an embodiment of the constant-voltage power supply unit according to the invention.

FIG. 1 shows the outline of the construction of a power supply unit embodying the present invention. In FIG. 1, such components as are found also in the conventional example shown in FIG. 6 are identified with the same reference numerals. In this embodiment, the power supply unit has a pnp-type transistor Q2 whose emitter is connected to a power source line 6 and whose base is connected to the output of the comparator 3. The ratio of the current flowing through this transistor Q2 to the current flowing through the output transistor Tr is set to 1: n (where n>1). The power supply unit also has a current limiting circuit 12 for limiting the output current of the comparator 3 and thereby limiting the output current of the output transistor Tr.

Figure 2:
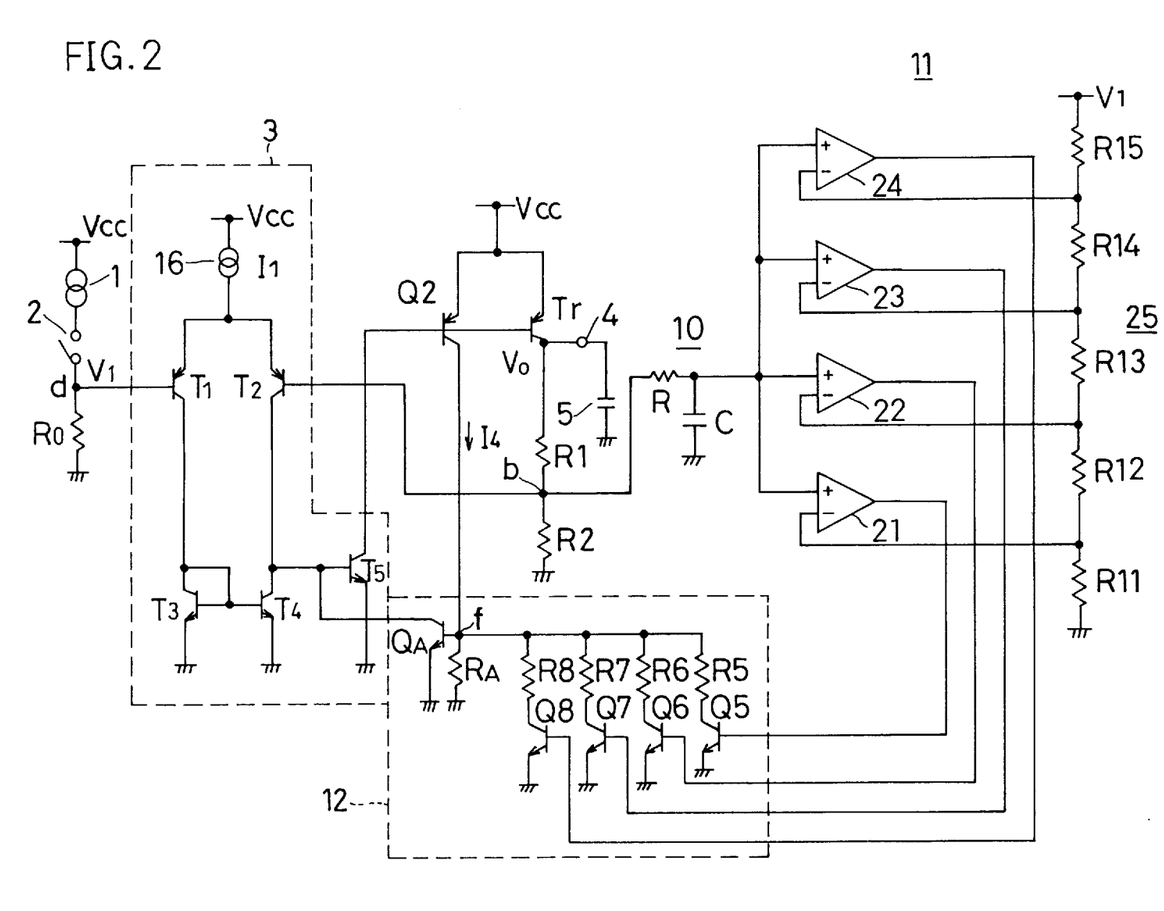
FIG. 2 is a circuit diagram showing the details of the construction of the circuit shown in FIG. 1.

The power supply unit is further provided with a delay circuit 10 for delaying the voltage at the node b, and a current limiting level control circuit 11 for varying, in accordance with the output voltage of the delay circuit 10, the level to which the current limiting circuit 12 limits the current. The current limiting circuit 12 limits the output current in accordance with a control signal supplied from the current limiting level control circuit 11. The delay circuit 10, the current limiting level control circuit 11, and the current limiting circuit 12 constitute an overcurrent prevention circuit for preventing overcurrent that occurs in the output at the start-up of the power supply unit. FIG. 2 is a circuit diagram showing the details of the comparator 3, the delay circuit 10, the current limiting level control circuit 11, and the current limiting circuit 12 shown in FIG. 1.

The comparator 3 is composed of a constant current source 16, a pair of pnp-type transistors T1 and T2 whose emitters are both connected to the constant current source 16, a pair of npn-type transistors T3 and T4 that are connected to the collectors of the transistors T1 and T2 so as to form a current mirror circuit, and a transistor T5 that serves as the output transistor of the comparator 3. The constant current source 16 is activated by a switch (not shown) that is interlocked with the switch 2.

The transistor T5 has its collector connected to the bases of both the transistor Q2 and the output transistor Tr, and has its emitter connected to ground. The base of the transistor T1 is connected to the node d, and the base of the transistor T2 is connected to the node b.

The current limiting circuit 12 is composed of an npn-type transistor $Q_A$ of which the collector is connected to the base of the transistor T5 and the emitter is connected to ground, a resistor $R_A$ of which one end is connected to the collector of the transistor Q2 and also to the base of the transistor $Q_A$ and the other end is connected to ground, and resistors R5 to R8 and npn-type transistors Q5 to Q8 of which one resistor is paired with one transistor in such a way that each pair is connected between the node f in the figure and ground.

The delay circuit 10 is an integrating circuit composed of a resistor R and a capacitor C. The current limiting level control circuit 11 is composed of four comparators (in general terms, a number N of comparators, where N≧1) that are so connected as to receive at their non-inverting input terminals (+) the output of the integrating circuit 10, and a reference voltage producing circuit 25 that supplies reference voltages to the inverting input terminals (−) of those comparators.

The reference voltage producing circuit 25 is composed of resistors R11 to R15 that are connected in series between a direct-current voltage V1 and ground. This voltage V1 is equal to the voltage that appears at the node d when the switch 2 is on (closed).

The circuit shown in FIG. 2 operates as follows. Before the switch 2, which interlocks the constant current sources 1 and 16, is turned on, the differential amplifier (the comparator 3) is in the off state. As a result, the transistor T5 is off, and accordingly the transistors Q2 and Tr are also off. When the switch 2 is turned on, a current from the constant current source 1 starts to flow through the resistor Ro, and thereby raises the voltage at the node d to a high level. At the same time, the constant current source 16 is also turned on, and accordingly the differential amplifier attempts to raise the voltage at the node b to a high level.

At this time, as long as the circuit is started up in an ordinary manner, the transistor T2 is turned on slightly later than the transistor T1, with the result that, at the start-up, the output transistor Tr attempts to output as much current as it can. Accordingly, to protect the output transistor Tr at the start-up, the resistor $R_A$ and the transistor $Q_A$ are provided that achieve feedback from T5 through Q2 to $R_A$ ($Q_A$). This keeps the output current constant at the start-up (it is assumed here that the transistor Tr has twice the current capacity of the transistor Q2).

However, even when $R_A$ and $Q_A$ are provided, the output transistor Tr is usually left free to operate almost at the top of its capacity, and therefore it outputs a considerably large current at the start-up (called the rush current). To prevent the rush current from becoming unduly large, the current limiting level control circuit 11 is provided that increases the output current stepwise at the start-up.

The current is increased in the following manner. As the capacitor C is charged, the output voltage of the delay circuit 10 increases. When this voltage reaches a predetermined level, the comparator 21 raises its output to a high level, and thereby turns on the transistor Q5 of the current limiting circuit 12. This causes the resistor R5 to be connected in parallel with the resistor $R_A$. As a result, the voltage at the node f drops, decreasing the current that is bypassed to ground by the transistor $Q_A$. This causes the base current of the transistor T5 and thus the collector current of the transistor T5 to increase accordingly, with the result that the output currents of the transistor Q2 and the output transistor Tr increase further. When the voltage at the capacitor C increases further until it reaches the next predetermined level, the comparator 22 also raises its output to a high level, and thereby turns on the transistor Q6 in addition to the transistor Q5. This causes the resistor R6, in addition to the resistor R5, to be additionally connected in parallel with the resistor $R_A$ in the current limiting circuit 12.

Figure 5:
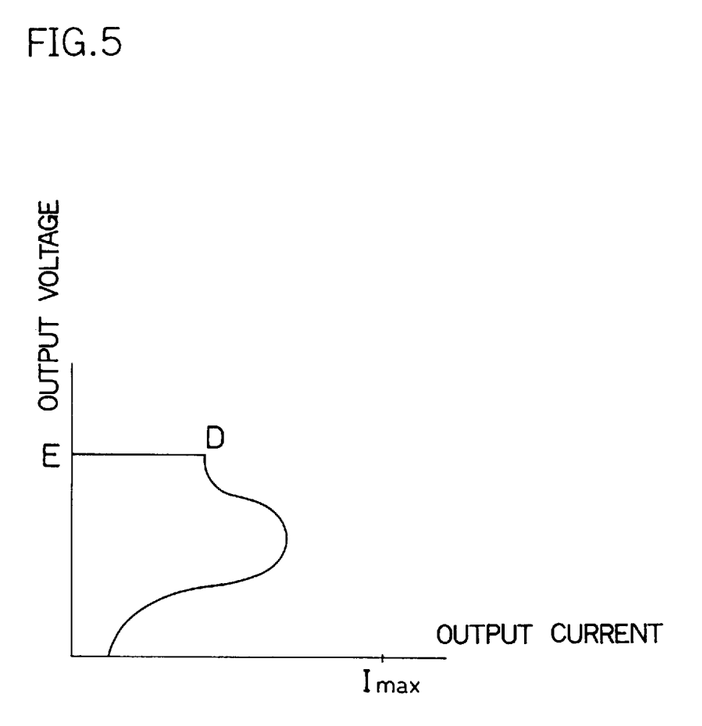
FIG. 5 is a diagram showing the characteristic curve of the output current at the start-up of the power supply unit according to the invention.

As a result, whereas the current that is bypassed through the transistor $Q_A$ decreases further, the output current increases. These operations are repeated until all of the transistors Q5 to Q8 are turned on and the output current reaches its maximum. In the characteristic curve shown in FIG. 5, once point D is reached (i.e. once the steady state is established), the output current is thereafter controlled by the comparator 3 in accordance with the voltage at the node b.

Here, explanations will be given as to why the delay circuit 10 and the resistors R5 to R8 are necessary. The delay circuit 10 is necessary for the following reason. Even if the current is increased stepwise by the use of the comparators 21 to 24 of the current limiting level control circuit 11, unless a delay is provided, the rush current would be as large as when there is no resistor like R5 to R8 (because then the capacitor 5 would not be charged sufficiently). Only by connecting a delay circuit 10 to the node b to produce a delay, it is possible to switch the comparators 21 to 24 from one to the next while charging the capacitor 5 and thereby limit the rush current at the start-up.

The resistors R5 to R8 are necessary for the following reason. Assume that the saturation voltage of the transistors Q5 to Q8 (npn-type transistors) is 0 V. Then, the level to which the current is limited depends only on $R_A$ as long as the voltage at the node b equals 0 V. Hence, the maximum value of the collector current of the transistor Q2 is $V_{F(QA)}/R_A$. As a result, as the output increases, a different one of R5, R6, R7, and R8 is connected in parallel with $R_A$ (i.e. the composite resistance decreases), and thus the level to which the current is limited increases.

To sum up, (1) when the differential amplifier (comparator 3) starts operating in response to the turning on of the switch 2, the output transistor Tr usually starts to output as much rush current as it can;

(2) how the current is limited is usually determined by providing feedback based on $V_F$ (threshold voltage) of $R_A$ and $Q_A$;

(3) to increase the output current stepwise, the comparators 21 to 24 are provided so that the level to which the current is limited is changed from one value to another;

(4) since it is meaningless to switch the current-limiting level without providing a delay when output of the current is started, the delay circuit 10 is provided so that it is possible, when output of the current is started, to charge the capacitor at the output sufficiently and thereby prevent the rush current from becoming unduly large.

Figure 3:
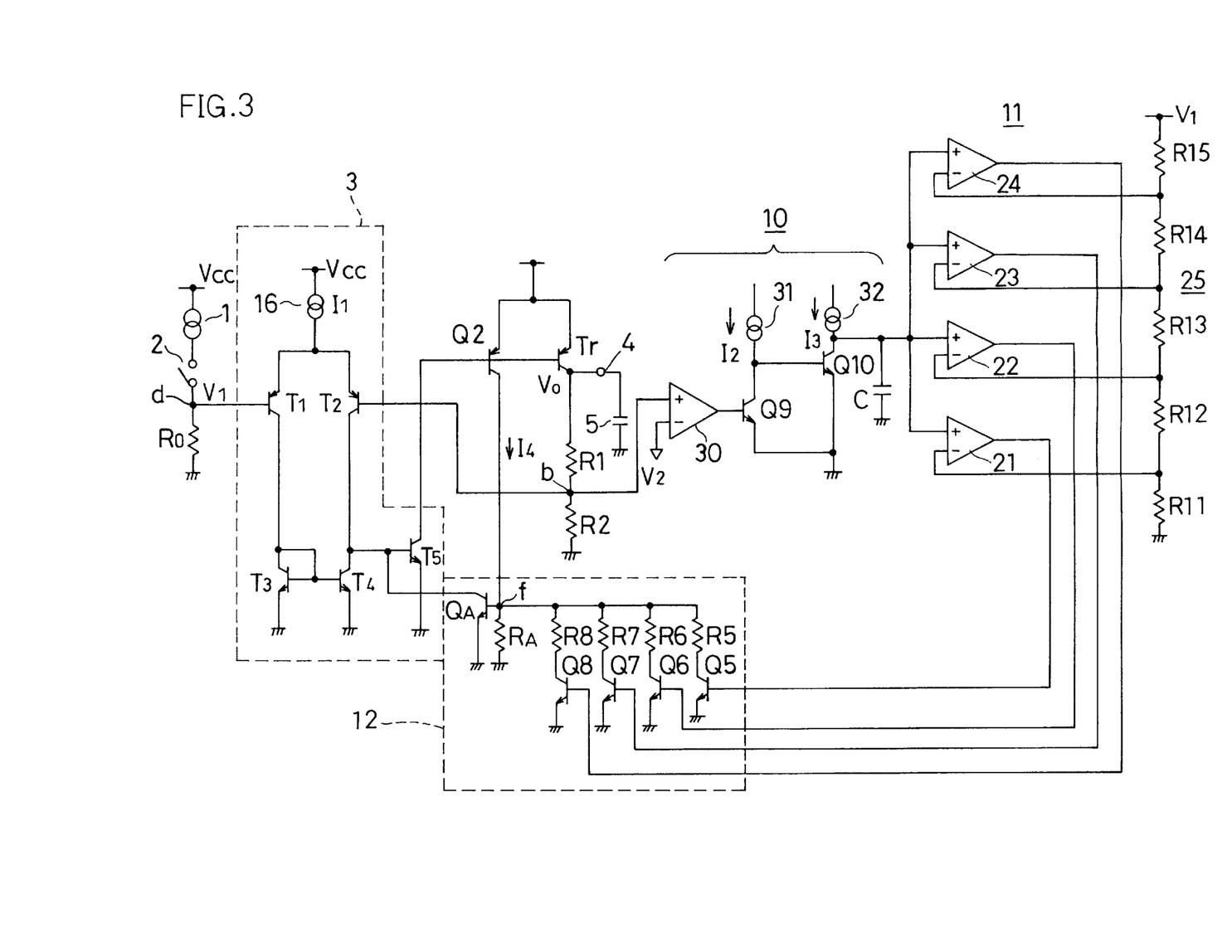
FIG. 3 is a circuit diagram showing another embodiment of the constant-voltage power supply unit according to the invention.

FIG. 3 shows another power supply unit embodying the present invention. This power supply unit is different from the one shown in FIG. 2 only in that its delay circuit 10 is composed of a comparator 30, npn-type transistors Q9 and Q10, constant current sources 31 and 32, and a capacitor C. In other respects, the power supply unit of this embodiment is constructed in the same manner as that of the previous embodiment. When the voltage at the node b exceeds a reference voltage V2, the comparator 30 raises its output to a high level, and thereby turns on the transistor Q9. This turns off the transistor Q10, and thereby causes a current $I_3$ to flow into the capacitor C.

On the other hand, when the comparator 30 outputs a low level, the transistor Q9 is turned off. As a result, the transistor Q10 receives as its base current the constant current $I_2$, and is thereby turned on. This causes the constant current $I_3$ to flow through the transistor Q10 to ground, and thus the capacitor C is not charged. The reason why the constant current source $I_3$ and the capacitor C are used is that, by charging a capacitor by use of a constant current source, it is possible to obtain linear rises in voltage and thereby switch the comparators 21 to 24 with higher precision.

Figure 4:
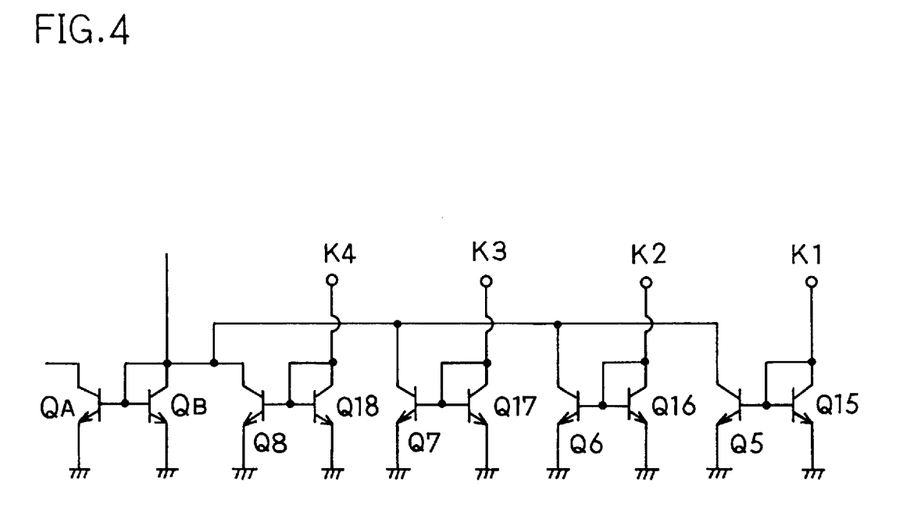
FIG. 4 is a circuit diagram showing a modified example of the current limiting circuit for the circuits shown in FIGS. 1 and 3.

In both of the power supply units shown in FIGS. 2 and 3, it is possible to modify the current limiting circuit 12 to the circuit shown in FIG. 4 without any change in their effects. In FIG. 4, the transistor QB, together with the transistor QA, forms a current mirror circuit that is driven by the collector current of the transistor Q2. The transistors Q5 to Q8 serve to reduce the conductance of the transistor QA (QB) by bypassing part of its drive current. The transistors Q5 to Q8 each form a current mirror circuit together with the corresponding one of the npn-type transistors Q15 to Q18. The terminals K1 to K4 are connected to the output of the comparators 21 to 24, respectively.

According to the present invention, it is possible to prevent a rush current from occurring when a power supply unit is started up by turning on its starting switch. Thus, it is possible to prevent undesirable effects on other circuits that are connected to the same power source line. Moreover, it is also possible to vary the output current stepwise, and thus increase the output current stepwise so that it rises smoothly until it reaches the steady-state level. Furthermore, it is possible to easily realize a stepwise-operating current limiting level control circuit simply by using a plurality of comparators that are of the same type but use different reference voltages.

What is claimed is:

1. A power supply unit having an output terminal connected to a node between a transistor and a resistor that are connected in series between a power source line and a reference potential point and having a capacitor connected between said output terminal and said reference potential point, said transistor being turned on in response to activation of a starting switch, comprising:

a delay circuit for delaying variations in an output voltage appearing at said output terminal;

a current limiting circuit for limiting a current flowing through said transistor; and a current limiting level control circuit for controlling, in accordance with an output of said delay circuit, a level to which said current limiting circuit limits the current, wherein output of an unduly large current is suppressed when the power supply unit is started up in response to the activation of the starting switch.

2. A power supply unit as claimed in claim 1, wherein said current limiting level control circuit comprises a plurality of comparators, each of which compares an output voltage of said delay circuit with a different reference voltage.

3. A power supply unit as claimed in claim 1, wherein said current limiting level control circuit follows a plurality of steps of increase in the output of said delay circuit in varying the level to which the current is limited.

4. A power supply unit as claimed in claim 3, wherein said current limiting level control circuit comprises a plurality of comparators, each of which compares an output voltage of said delay circuit with a different reference voltage.

5. A power supply unit comprising:

a pnp-type output transistor and a resistor circuit connected in series between a power source line and ground;

an output terminal connected to a node between the output transistor and the resistor circuit;

a capacitor connected between the output terminal and ground;

a first transistor of a pnp type whose emitter and base are connected respectively to an emitter and a base of the output transistor;

a first resistor connected between a collector of the first transistor and ground;

a starting switch for starting the power supply unit;

base current supplying means for starting supply of base currents to the output transistor and to the first transistor in response to operation of the starting switch;

means for controlling the base current supplying means in such a way that the base currents are reduced in accordance with a voltage appearing across the first resistor;

a plurality of pairs of a resistor and a switching device, each pair being connected in parallel with the first resistor;

delay means for delaying a rise in a voltage at a predetermined point in the resistor circuit;

means for producing an output signal stepwise in accordance with a rise in an output of the delay means; and means for directing the output signal to the switching devices in such a way that the switching devices are turned on and off in accordance with the output signal that is produced stepwise.

6. A power supply unit comprising:

a pnp-type output transistor and a resistor circuit connected in series between a power source line and ground;

an output terminal connected to a node between the output transistor and the resistor circuit;

a capacitor connected between the output terminal and ground;

a first transistor of a pnp type whose emitter and base are connected respectively to an emitter and a base of the output transistor;

a first resistor connected between a collector of the first transistor and round;

a starting switch for starting the power supply unit;

base current supplying means for starting supply of base currents to the output transistor and to the first transistor in response to operation of the starting switch;

means for reducing the base currents by use of a collector current of the first transistor;

a plurality of switching devices connected between the collector of the first transistor and ground so that use of the collector current is reduced by directing the collector current to ground;

delay means for delaying a rise in a voltage at a predetermined point in the resistor circuit;

means for producing an output signal stepwise in accordance with a rise in an output of the delay means; and means for directing the output signal to the switching devices in such a way that the switching devices are turned on and off in accordance with the output signal that is produced stepwise.

* * * * *